(No Model.)
G. A. PICKUP & W. A. MOORE.
PROCESS OF MAKING MATRICES.
No. 580,144. Patented Apr. 6, 1897.
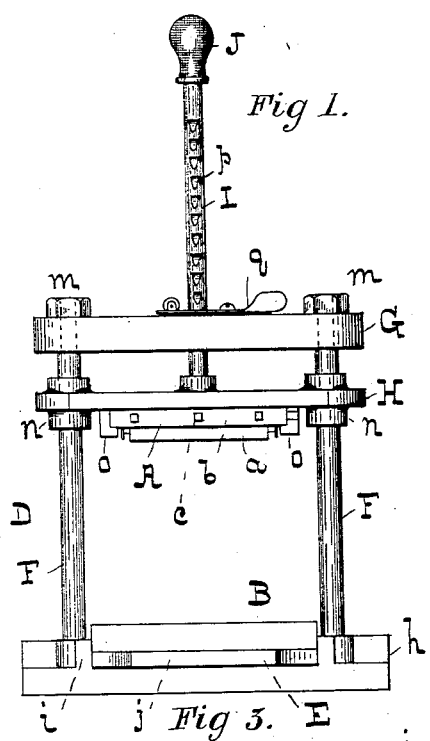
Fig 1.
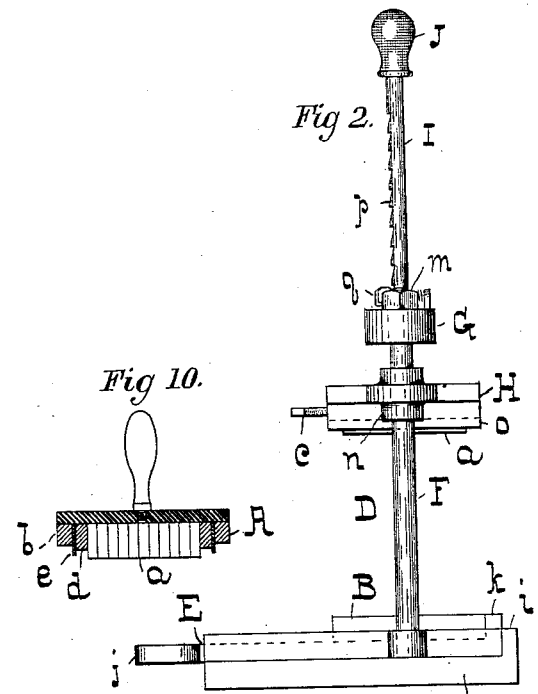
Fig 2.
Fig 10.
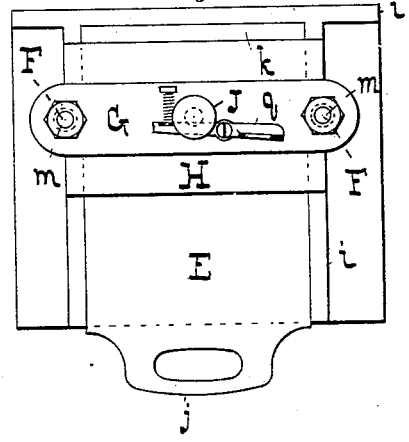
Fig 3.
Fig 4. Fig 5.
Fig 6.
Fig 7. Fig 8.
Fig 9.
-WITNESSES-
Dan'l Fisher
Harry Constantine
-INVENTORS-
George A. Pickup,
William A. Moore,
by W. J. Howard,
Atty.
THE NORRIS PETERS CO., PHOTO-LITHO., WASHINGTON, D. C.

UNITED STATES PATENT OFFICE.

GEORGE ALEXANDER PICKUP AND WILLIAM ALEXANDER MOORE, OF BALTIMORE, MARYLAND.

PROCESS OF MAKING MATRICES.

SPECIFICATION forming part of Letters Patent No. 580,144, dated April 6, 1897.

Application filed June 11, 1896. Serial No. 595,096. (No specimens.)

*To all whom it may concern:*

Be it known that we, GEORGE ALEXANDER PICKUP and WILLIAM ALEXANDER MOORE, of the city of Baltimore, in the State of Maryland, have invented certain Improvements in Processes of Making Matrices for Rubber Type and Stereotypes, of which the following is a specification.

Our invention relates to an improved process for making matrices for the reproduction in rubber, metal, celluloid, and other suitable substances of type and engraved blocks having designs in intaglio or rilievo, but especially for forming rubber type for stamps.

Our matrices differ from those ordinarily used in that they are made from a metal which is practically the same as that from which are formed the type or blocks employed as a pattern in the matrix-making operation. To prepare the metal for the purpose, it is first heated, so as to bring it into a fluid or melted condition, after which it is poured into a suitable flask and allowed to cool slightly or until it assumes a plastic condition. The pattern, consisting of set-up type or blocks, is then suddenly dropped or plunged into the plastic mold, and after the mold is sufficiently set it is separated from the pattern and then forms the matrix, which is finished and fitted up in the usual manner and used in making type from rubber, metal, celluloid, or other suitable substance, as will hereinafter fully appear.

In the further description of the said invention which follows reference is made to the accompanying drawings, forming a part hereof, and in which—

Figure 1 is a front view of the apparatus which we use in making metallic matrices. Fig. 2 is a side view. Fig. 3 is a plan. Figs. 4 to 9, inclusive, are details of the apparatus hereinafter described. Fig. 10 illustrates an alternate construction of a part of the apparatus hereinafter described.

Referring now to Figs. 1 to 9, inclusive, of the drawings, A is a chase in which metal type $a$ or engraved blocks are set up and locked. It consists of the usual rectangular frame $b$, having set-screws $c$ for locking the type in position. The set-up matter or type is surrounded by blanks $d$ and strips $e$, as shown in Figs. 7, 8, and 9.

B is the flask, in which the matrix is formed. It consists of a plate $f$, having raised edges $g$, (see Figs. 4, 5, and 6,) which are respectively a plan, a transverse cross-section, and a longitudinal section of the flask.

C C are strips of wood secured in the flask, and to admit of the fastening of the side strips the raised edges at the ends of the flask are slotted. (See Fig. 4.) The object of these wood strips will hereinafter appear.

D is a drop-press consisting of a base $h$ with flanges $i$ at three sides.

E is a sliding plate having a handle $j$ at the front and a flange $k$ at its rear side adapted to be slid onto the base $h$ of the press. The width of this plate is equal to the length of the flask to be placed thereon at the beginning of the matrix-making operation. From the side flanges $i$ of the base $h$ extend vertical columns F, formed of round rods.

G is a head fastened to the upper ends of the columns F by means of nuts $m$.

H is a chase-carrier having bosses $n$, bored to fit the columns F. The chase-carrier is adapted to slide up and down on the columns, and it has on its under side grooved strips $o$ to hold the chase A.

I is a bar which passes through a hole in the head G with its lower end fastened to the chase-carrier H. The upper end of the bar I is formed into a handle J, and throughout its length it is furnished with ratchet-teeth $p$. A spring-held pawl $q$, pivoted to the upper face of the head G, serves to hold the chase-carrier H at any height within the range of its movement, and by pushing in the outer end of the spring-held pawl the carrier with the chase is dropped, so that the set-up type will enter the flask beneath it.

The operation of making matrices for rubber type by means of this apparatus is as follows: The type or matter to be reproduced, which is of ordinary type-metal, is first set up in the chase and locked. The filled chase is then placed between the rabbeted strips $o$ under the carrier H, which is elevated to the required height, the chase and carrier being held by the toothed bar and the spring-pawl.

To prepare the flask to receive the molten type-metal, it is slightly heated, as is also the chase containing the type. The wood strips C are then placed in position and the whole covered by a sheet of thin paper. The molten type-metal is now poured on the paper in the flask, and as it begins to cool the operator tries its consistency by dipping in it a strip of wood. When the poured metal has assumed a plastic condition of the proper consistency, the flask already on the sliding plate E is slid under the chase. The operator now pushes in the spring-held pawl $q$, and the carrier H with its chase falls, and the type or other set-up matter is embedded in the plastic type-metal.

The object of the wood strips and the paper is to protect the molten metal from contact with the metal of the flask, so that it will not cool more rapidly at the bottom than at the top and center.

It will be understood that the temperature of the plastic metal in the flask is not high enough to injure the type in the chase. The heat communicated to the type is sufficient to bring it to nearly the same temperature as the matrix before the latter has fully set. Consequently the matrix does not shrink on the type so as to prevent the withdrawal of the latter from the former at a subsequent stage of the operation.

The next step consists in removing the matrix from the flask and placing the chase with the type face up on the bed of an ordinary type-planing machine. The bottom of the matrix is then planed to make it parallel with the surface of the base of the type, after which the type is withdrawn from the matrix and the superfluous metal at the edge of the matrix sawed off, leaving only the portion which contains the impressions of the type. The matrix is now finished and ready to be placed in a vulcanizer or other type-forming apparatus to be manipulated in the usual way. The uniform contraction of the type and the matrix is well illustrated by the fact that after the completion of the matrix it may be placed again over the set-up matter or type without difficulty, the fit being perfect.

In the foregoing description we have illustrated only the production of matrices, but a matrix may be used instead of set-up matter as a pattern, and type produced in lieu of a matrix. Type produced as described is a facsimile of that used originally in the formation of the matrix, and is, in fact, a stereotype and may be used as such. It is found that stereotypes made as described are nearer perfect than those cast from papier-mâché, now commonly used.

It must be understood that to make a perfect matrix or one in which the edges are sharp and the faces free from holes no air must be allowed to collect between the pattern and the mold as the impression is made. The collection of air between them can be prevented only by plunging the pattern into the plastic-metal mold. A gradual introduction of the pattern into the soft plastic metal will not expel the air.

Fig. 10 is a partly-sectional side view of a chase having a back plate to which is secured a handle. This is used in place of the chase before described in small work. The handle is grasped by the hand and the pattern plunged into the plastic metal.

We claim as our invention—

The process of making matrices herein described, which consists in providing a pattern of set-up type or type-metal blocks of the alloy commonly known as "type-metal," then pouring molten type-metal of substantially the same composition into a flask and allowing the same to become chilled so that it will constitute a plastic body, and then quickly plunging all parts of the face of the metal pattern simultaneously into the plastic metal, substantially as and for the purpose specified.

GEORGE ALEXANDER PICKUP.
WM. ALEXANDER MOORE.

Witnesses:
DANL. FISHER,
WM. T. HOWARD.